G. E. NEUBERTH.
CASTER FOR FURNITURE.
APPLICATION FILED JULY 2, 1908.
934,004.
Patented Sept. 14, 1909.
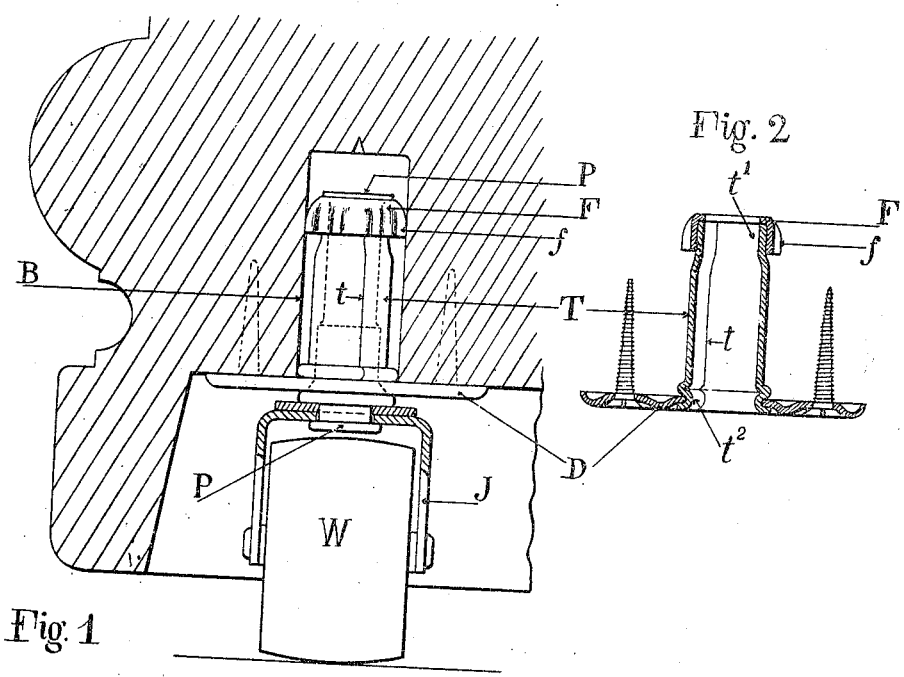
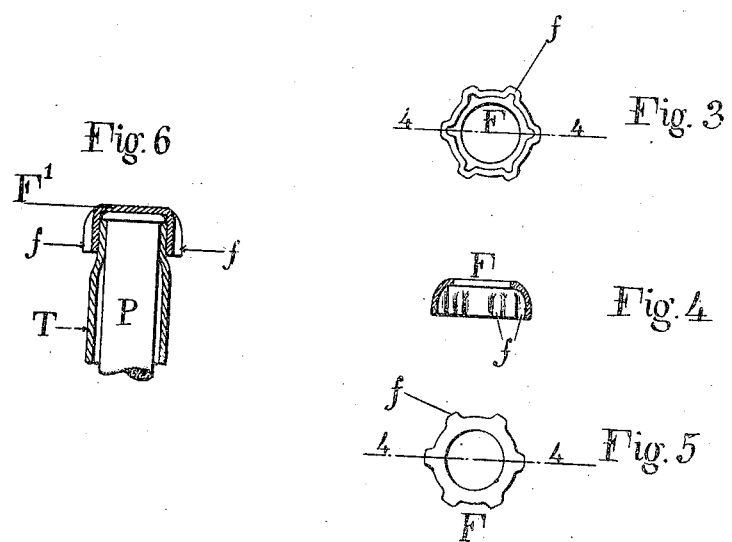
Witnesses:
George E. Neuberth Inventor
By his Attorneys

UNITED STATES PATENT OFFICE.

GEORGE E. NEUBERTH, OF NEWARK, NEW JERSEY, ASSIGNOR TO UNIVERSAL CASTER & FOUNDRY COMPANY, A CORPORATION OF NEW JERSEY.

CASTER FOR FURNITURE.

934,004.

Specification of Letters Patent. Patented Sept. 14, 1909.

Application filed July 2, 1908. Serial No. 441,593.

*To all whom it may concern:*

Be it known that I, GEORGE E. NEUBERTH, a citizen of the United States, residing at Newark, New Jersey, have invented certain new and useful Improvements in Casters for Furniture, of which the following is a specification, (Case 3,) illustrated by drawings.

The invention relates particularly to casters for pianos and other heavy furniture, but its applicability is by no means limited thereto.

It relates particularly to the manner of securing the caster pintle so that it may turn in bearings and be securely supported relatively to the leg by a structure that is economical to manufacture.

The invention and its various parts will be readily understood from the following description and claims.

In the drawings, Figure 1 is an elevation partly in central section through the leg, showing a caster embodying the invention and applied to a piano leg. Fig. 2 is a detail vertical sectional view of portions of the same caster. Figs. 3, 4, and 5 are respectively a bottom view, a section on the plane 4—4, and a plan view of the flange member shown in Figs. 1 and 2. Fig. 6 is a detail view partly in section, showing a modification.

In the preferred embodiments shown in Figs. 1 to 5 inclusive the caster wheel W, jaws J, pintle P, and disk or flange D screwed or otherwise secured to the leg are illustrated in a well known form which it is unnecessary further to describe. The disk D may carry the weight of the leg onto the enlarged portion of the pintle, as illustrated. The journals or bearings for the pintle P are furnished by a tubular portion or member T which, for economy of manufacture, may be made of sheet metal with an open longitudinal seam *t*. Whether seamless or having such an open seam *t*, the socket or bearing T is closely embraced and externally supported by the disk D and is preferably turned over or upset on either face of the disk, as in Fig. 2. It should preferably externally fit and be supported by the lower end of the hole or bore B in the leg, as is well understood.

My improvement particularly concerns the upper portions of the caster, which in the most perfect form of the invention is reinforced on the exterior of the socket or bearing T by a flange member F formed of sheet metal and crimped down so as to firmly embrace and externally strengthen and support the upper end of the tubular socket T, and which is provided with several externally projecting bends or folds *f* of the down-turned flange that closely fit and derive external support from the wall of the bore B in the leg, as seen in Fig. 1. I prefer also that the upper end of the pintle P project through the flange member F and be riveted over or headed up above it so as to hold the pintle to the socket, and furthermore, that the hole in the flange member be of the same diameter as the internal diameter of the upper end of the socket, so that both may jointly form a journal bearing for the upper end of the pintle. The tubular socket T is shown reduced slightly at its upper portion to form an approximately accurate bearing for the pintle, as at *t′*, and of full size at *t″* where it is secured to the disk D and forms the lower journal bearing for a larger diameter of the pintle P. The flange member F in the form illustrated constitutes a cap which is preferably completed before it is placed upon the upper end of the tubular socket and fits the same so tightly that it has to be jammed or forced thereon with considerable pressure so as to produce a very strong and well supported upper bearing for the pintle.

In the modification shown in Fig. 6 the flange member is imperforate, the pintle P being first upset or headed to hold it to the tubular socket T and then the flange member F′ is put on and forms a complete cap inclosing the head of the pintle and embracing the end of the tubular socket T.

In the operation of the invention as embodied in the caster above described, the bore B of proper size is formed in the leg and the socket is thrust into place in the bore, the portions *f* fitting the bore, the disk D being then screwed to the leg. The pintle is free to turn and is very firmly and securely supported in such a way that the tubular socket is subjected to very slight disrupting stresses and a very strong, durable, easily constructed and easily applied construction is assured even though very light sheet metal be used in the socket or bearing.

The invention is, of course, not necessarily restricted to the use of sheet metal in any of the parts

I claim the following:

1. A caster having a pintle and a tubular socket or bearing for the pintle, distinguished by having a winged flange member with downwardly extending portions for embracing and externally supporting the tubular socket or bearing and adapted to fit and be supported in turn by the bore of the leg with which the caster is used, the upper end of the pintle projecting through the said flange member and being secured to the socket thereby.

2. A caster having a pintle and a tubular socket or bearing therefor, distinguished by having at the upper end of the socket or bearing a flange member projecting laterally of the socket, the flange of which extends downward upon the outside of the socket or bearing and embraces and supports the same.

3. A caster having a pintle and a tubular socket or bearing therefor, distinguished by having at the upper end of the socket or bearing a flange member projecting laterally of the socket, the flange of which extends downward upon the outside of the socket or bearing and embraces and supports the same, the pintle projecting through the said flange member and being enlarged so as to be held by the said member.

4. A caster having a pintle and tubular socket therefor and a member, portions of which extend down in contact with the exterior of the said socket and thereby embrace and strengthen it, said member also projecting laterally from the socket to fit and be supported by the interior of the leg in which the caster is used.

5. A caster having a pintle and tubular socket, a leg-supporting flange which embraces and strengthens the lower end of the socket and which is provided with means for securing the socket to a leg, said caster also having an embracing member which extends downward in contact with and embracing the upper portion of the socket, and which projects laterally from the socket to fit the bore of a leg.

6. A caster having a pintle and tubular socket therefor, said socket having at its lower end a leg-supporting flange and at its upper end a supporting and embracing member which extends downward in contact with the socket and also projects laterally from the socket to support the same within a leg.

7. A caster having a pintle and a tubular socket therefor and a member embracing the upper portion of the tubular socket and having a downwardly extending crimped or folded flange in contact with the exterior of the socket.

8. A caster having a pintle and a tubular socket or bearing for the pintle, distinguished by having a winged flange member with downwardly extending portions for embracing and externally supporting the tubular socket or bearing and projecting laterally from the socket and thereby adapted to fit and be supported in turn by the bore of the leg with which the caster is used, and further distinguished by having a leg-supporting flange and means for securing such flange to the leg.

9. A caster having a pintle and a tubular socket or bearing for the pintle, distinguished by having a flange member with downwardly extending portions for embracing and externally supporting the tubular socket or bearing and which project outward from the socket and are adapted to fit and be supported in turn by the bore of the leg with which the caster is used, the upper end of the pintle projecting through the said flange member and being secured to the socket thereby, and further distinguished by having a leg-supporting flange and means for securing such flange to the leg.

In testimony whereof I have signed this specification in the presence of two subscribing witnesses, June 30, 1908.

GEORGE E. NEUBERTH.

Witnesses:
J. A. HARRIS,
JAMES GOVERN.